United States Patent
Tu et al.

(10) Patent No.: US 10,495,661 B2
(45) Date of Patent: Dec. 3, 2019

(54) METHOD AND DEVICE FOR MONITORING STATE OF MOVING OBJECT AND SYSTEM FOR FAST INSPECTING VEHICLE

(71) Applicant: Nuctech Company Limited, Beijing (CN)

(72) Inventors: Junjie Tu, Beijing (CN); Yanwei Xu, Beijing (CN); Weifeng Yu, Beijing (CN); Yongming Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 406 days.

(21) Appl. No.: 15/278,447

(22) Filed: Sep. 28, 2016

(65) Prior Publication Data
US 2017/0160304 A1    Jun. 8, 2017

(30) Foreign Application Priority Data

Dec. 4, 2015    (CN) .......................... 2015 1 0886306

(51) Int. Cl.
*G01P 3/68*    (2006.01)
*G01S 17/42*    (2006.01)
(Continued)

(52) U.S. Cl.
CPC .................. *G01P 3/68* (2013.01); *G01P 3/36* (2013.01); *G01S 17/42* (2013.01); *G01S 17/58* (2013.01);
(Continued)

(58) Field of Classification Search
CPC ... G01P 3/68; G01P 3/36; G01S 17/42; G01S 17/58; G01S 17/88
See application file for complete search history.

(56) References Cited

U.S. PATENT DOCUMENTS 6,124,932 A * 9/2000 Tax .......................... B66C 13/46
                                                   212/285
6,697,147 B2    2/2004 Ko et al.
(Continued)

FOREIGN PATENT DOCUMENTS

CN    102445183 A    5/2012
CN    103370600 A    10/2013
(Continued)

OTHER PUBLICATIONS

Extended European Search Report dated Apr. 19, 2017 received in European Patent Application No. 16 19 1237.3.
(Continued)

*Primary Examiner* — Eric L Bolda
(74) *Attorney, Agent, or Firm* — Scully Scott Murphy & Presser

(57) ABSTRACT

The present disclosure relates to a method and a device for monitoring a state of a moving object and a system for fast inspecting a vehicle. The method and a device for monitoring a state of a moving object positions and measures speed of the moving object by using a laser scanner. The device includes: a laser scanner configured to monitor at least one moving object entering a monitoring region, by emitting a plurality of laser beams of different angles to the at least one moving object with a preset scanning frequency; and a processing unit configured to, for each moving object, determine and output a relative position of the moving object with respect to the laser scanner at each time instance. It can significantly improve the accuracy of measuring a low speed of the moving object, and the laser scanner is easy to install and has a low cost.

20 Claims, 5 Drawing Sheets

(51) Int. Cl.
*G01S 17/58* (2006.01)
*G01S 17/88* (2006.01)
*G08G 1/04* (2006.01)
*G01P 3/36* (2006.01)
*G08G 1/052* (2006.01)
*G01V 5/00* (2006.01)

(52) U.S. Cl.
CPC ............ *G01S 17/88* (2013.01); *G01V 5/0016* (2013.01); *G08G 1/04* (2013.01); *G08G 1/052* (2013.01)

(56) References Cited

U.S. PATENT DOCUMENTS

| | | | |
|---|---|---|---|
| 8,599,368 B1* | 12/2013 | Cilia | G01P 3/36 356/28 |
| 2005/0285738 A1 | 12/2005 | Seas et al. | |
| 2013/0229644 A1 | 9/2013 | Chung et al. | |
| 2014/0226146 A1 | 8/2014 | Loschmidt | |

FOREIGN PATENT DOCUMENTS

| | | |
|---|---|---|
| CN | 203288083 U | 11/2013 |
| CN | 103884288 A | 6/2014 |
| CN | 104751643 A | 7/2015 |
| CN | 105445745 A | 3/2016 |
| CN | 205427190 U | 8/2016 |
| EP | 0 636 900 A3 | 10/1996 |
| EP | 1 531 343 A1 | 5/2005 |
| EP | 2 204 788 A1 | 7/2010 |
| EP | 2 221 640 A2 | 8/2010 |
| WO | WO 2012/106730 A2 | 8/2012 |

OTHER PUBLICATIONS

Search Report dated Apr. 11, 2019 received in Singapore Patent Application No. SG 10201608191T.

* cited by examiner

METHOD AND DEVICE FOR MONITORING STATE OF MOVING OBJECT AND SYSTEM FOR FAST INSPECTING VEHICLE

CROSS-REFERENCE TO RELATED APPLICATIONS

The present application is based upon and claims priority to Chinese Patent Application No. CN 201510886306.6 filed Dec. 4, 2015, the entire contents of which are incorporated herein by reference.

TECHNICAL FIELD

The present disclosure generally relates to the technology for monitoring a state of a moving object, and more particularly, to a method and a device for monitoring a state of a moving object based on a laser scanner, and a system for fast inspecting a vehicle which incorporates the device.

BACKGROUND

Nowadays, in order to monitor a state (such as a speed) of a moving object (such as a vehicle), conventionally a speed sensor (such as a radar) for sensing speed is used. However, since the radar may be inaccurate for sensing a low speed (for example, less than 5 kilometers per hour), the radar has rather limited application. In addition, the radar for sensing speed generally costs expensively in manufacture, installation, testing and calibration, lacking economy and maintainability.

In addition, in the field of fast inspecting a vehicle based on radiation scanning, in order to monitor a state of a subject vehicle, conventionally, a plurality of photoelectric switches or light curtains as well as ground sensor coils are installed in the inspection channel to inspect the travelling state of the subject vehicle. However, since it may be inaccurate to measure a position and a speed of the subject vehicle by utilizing the photoelectric switches or light curtains, mistaken determination are often made about the timing for emitting radiation beams, posing risks to the security of the driver of the vehicle.

SUMMARY

In view of the above, the present disclosure provides a method and a device for monitoring a state of a moving object based on a laser scanner, and a system for fast inspecting a vehicle which incorporates the device.

Additional aspects and advantages of the present disclosure will be partly set forth in the following description and partly become apparent from the description, or can be learned from practice of the present disclosure.

One aspect of the present disclosure provides a device for monitoring a state of a moving object, including: a laser scanner configured to monitor at least one moving object entering a monitoring region, by emitting a plurality of laser beams of different angles to the at least one moving object with a preset scanning frequency; and a processing unit configured to, for each moving object, determine at least one fixed point on the moving object, receive a first distance between the at least one fixed point of the moving object and an emitting position of the laser beams and an emitting angle of a corresponding laser beam, all of which are detected by the laser scanner at each time instance, and determine and output a relative position of the moving object with respect to the laser scanner at each time instance according to the first distance and the emitting angle of the corresponding laser beam.

In an embodiment, the processing unit is further configured to, for each moving object, according to the determined relative position of the moving object with respect to the laser scanner, output a current relative position of the moving object with respect to the laser scanner with different time intervals or with different moving distance intervals of the moving object.

In another embodiment, when the moving object moves towards the laser scanner, the smaller the relative distance between the moving object and the laser scanner is, the smaller the time interval or the moving distance interval is.

In yet another embodiment, the processing unit is further configured to, for each moving object, determine and output a moving speed of the moving object according to the first distance and the emitting angle of the corresponding laser beam.

In yet another embodiment, the at least one fixed point includes a plurality of fixed points, and determining a moving speed of the moving object according to the first distance and the emitting angle of the corresponding laser beam includes: acquiring a second distance of the moving object at a time instance according to first distances between the fixed points of the moving object and the emitting position of the laser beams at the same time instance; and determining the moving speed of the moving object according to second distances of the moving object at time instances.

In yet another embodiment, the processing unit is configured to average the first distances to acquire the second distance.

In yet another embodiment, the processing unit is further configured to, for each moving object, determine a moving direction of the moving object at a current time instance.

In yet another embodiment, the processing unit is configured to determine the moving direction of the moving object at the current time instance according to the different relative positions of the moving object with respect to the laser scanner at the current time instance and at the previous time instance.

Another aspect of the present disclosure provides a method for monitoring a state of a moving object based on a laser scanner, including: monitoring at least one moving object entering a monitoring region, by causing the laser scanner to emit a plurality of laser beams of different angles to the at least one moving object with a preset scanning frequency; and for each moving object, determining at least one fixed point on the moving object; receiving a first distance between the at least one fixed point of the moving object and an emitting position of the laser beams and an emitting angle of a corresponding laser beam, all of which are detected by the laser scanner at each time instance; and determining and outputting a relative position of the moving object with respect to the laser scanner at each time instance according to the first distance and the emitting angle of the corresponding laser beam.

In an embodiment, the method further includes: for each moving object, according to the determined relative position of the moving object with respect to the laser scanner, determining and outputting a current relative position of the moving object with respect to the laser scanner with different time intervals or with different moving distance intervals of the moving object.

In another embodiment, the method further includes: for each moving object, determining and outputting a moving speed of the moving object according to the first distance and the emitting angle of the corresponding laser beam.

In yet another embodiment, the at least one fixed point includes a plurality of fixed points, and determining a moving speed of the moving object according to the first distance and the emitting angle of the corresponding laser beam includes: acquiring a second distance of the moving object at a time instance according to first distances between the fixed points of the moving object and the emitting position of the laser beams at the same time instance; and determining the moving speed of the moving object according to second distances of the moving object at time instances.

In yet another embodiment, the method further includes: for each moving object, determining a moving direction of the moving object at a current time instance.

Yet another aspect of the present disclosure provides a system for fast inspecting a vehicle, including: a radiation imaging device including: a ray source configured to emit radiation rays for detecting a subject vehicle; a detector configured to detect radiation rays transmitted through the subject vehicle and/or scattered radiation rays; and an image processing device configured to present images according to signals of the radiation rays detected by the detector; the device for monitoring a state of a moving object of any one of the above; and a controlling device configured to control the radiation imaging device to emit radiation rays to the subject vehicle according to the output of the device for monitoring a state of a moving object.

By positioning or measuring a speed of a moving object using a laser scanner, the device and the method for monitoring a state of a moving object provided by the present disclosure can significantly improve the accuracy of measuring a low speed of a moving object compared with a speed measuring sensor such as the radar. Moreover, the laser scanner is easy to install and has a low cost. In addition, the laser scanner can also easily detect an abnormal state (such as travelling backward or stopping in an inspection channel) of the moving object to allow fast handling of the moving object. In addition, by utilizing the device for monitoring a moving object, the system for fast inspecting a vehicle of the present disclosure can improve the accuracy in determining the timing for emitting radiation rays, so as to effectively avoid security risk to the driver caused by mistaken determination of the head of the subject vehicle.

BRIEF DESCRIPTION OF THE DRAWINGS

The above and other features and advantages of the present disclosure will become apparent from exemplary embodiments thereof described in detail with reference to accompanying drawings.

DETAILED DESCRIPTION

Hereinafter, the exemplary embodiments will be described more fully with reference to the accompanying drawings. However, the exemplary embodiments can be implemented in various manners, and should not be understood as limited to the embodiments set forth herein. Instead, these embodiments are provided to make the present disclosure more thorough and complete, and to fully convey the concept of the exemplary embodiments to those skilled in the art. Throughout the accompanying drawings, like symbols represent like or the same structure, and thus the redundant description will be omitted.

The features, structure and characteristics described can be combined in one or more embodiments in any suitable way. In the following description, more specific details are provided to enable thorough understanding of the embodiments of the present disclosure. However, it should be appreciated by those skilled in the art that the technical solution of the present disclosure can be practiced without one or more of the particular details or can be practiced with other methods, components or materials, and so on. In some cases, known structure, material or operation will not be illustrated in detail to avoid obscuration of the present disclosure.

Figure 1:
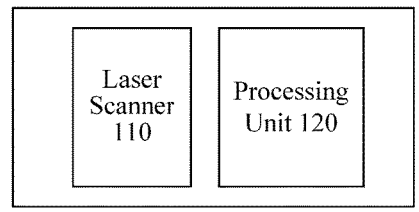
FIG. 1 is a block diagram illustrating a device for monitoring a moving object based on a laser scanner according to an exemplary embodiment.

FIG. 1 is a block diagram illustrating a device for monitoring a moving object based on a laser scanner according to an exemplary embodiment. As shown in FIG. 1, the device 10 for monitoring a moving object includes a laser scanner 110 and a processing unit 120.

In an embodiment, the laser scanner 110 is configured to monitor at least one moving object entering a monitoring region, by emitting a plurality of laser beams at various angles to the at least one moving object with a preset scanning frequency.

Figure 2:
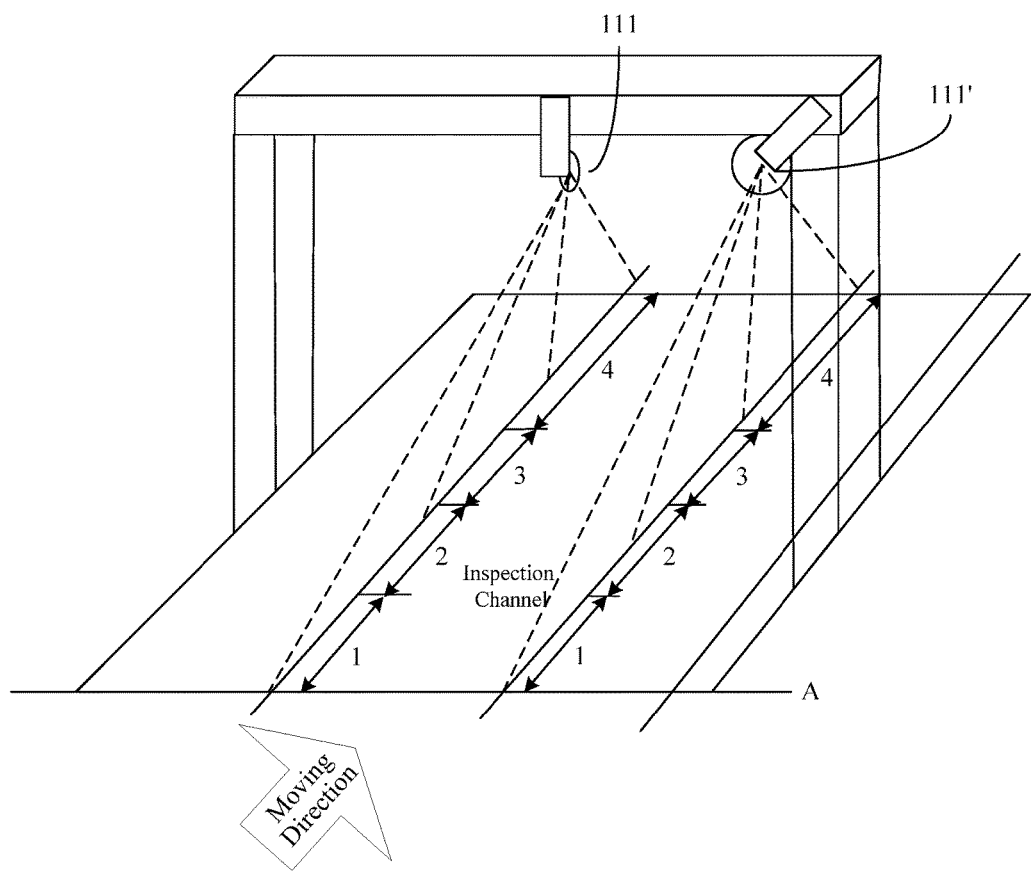
FIG. 2 is a schematic diagram illustrating a monitoring region of a laser scanner according to an example.

FIG. 2 is a schematic diagram illustrating a monitoring region of a laser scanner according to an example. As shown in FIG. 2, the laser scanner 110 can be installed through two approaches. For a first approach, as shown by the laser scanner 111, for example, the laser scanner can be disposed on top of the inspection channel, with the scanning cross section being perpendicular to the ground of the inspection channel. For a second approach, as shown by the laser scanner 111', for example, the laser scanner can be disposed at a side of of the inspection channel, with the scanning cross section forming an acute angle or a blunt angle with the ground of the inspection channel. The laser scanner 111 or 111' can monitor the at least one moving object with a preset scanning frequency, for example 100 Hz (i.e. 100 times of scanning per second), and simultaneously emit a plurality of laser beams at various angles at a time. The plurality of laser beams constitute a scanning cross section covering a range (the monitoring region of the laser scanner 111 or 111') with a starting point A. The monitoring range of the laser scanner can be very broad, generally covering a continuous monitoring range of 80 meters or even longer in a front and back direction.

In some embodiments, since when monitoring a moving object using the laser scanner 110, the laser scanner 110 can cover a very broad monitoring range, in order to avoid storage of a mass of unnecessary monitored data, generally, before the moving object passes beneath the laser scanner, the monitored data of the moving object will not be processed until the moving object reaches a preset position (corresponding to the position of the laser scanner). That is, the moving object will be considered as just entering the monitoring region from the preset position. In practice, for example, the preset position can be disposed at for example 25 meters ahead of the installation position of the laser scanner. However, the present disclosure is not limited thereto. Hereinafter a requirement on a minimum distance between two adjacent moving objects respectively for the above two installation approaches will be described.

For the first installation approach, firstly it is assumed that the laser scanner 111 is installed at a height of 5.2 meters for example, and all the moving objects have the same height, for example 4.8 meters. When a moving object comes to a distance of 25 meters from the laser scanner, the moving object is considered as just entering the monitoring region. In order to monitor more than one moving objects within the monitoring region at the same time, it can be deduced that the minimum distance between two adjacent moving objects within the monitoring region is 2 meters.

For the second installation approach, similarly, it is assumed that the laser scanner 111' is installed at a height of 5.2 meters for example, and all the moving objects have the same height, for example 4.8 meters. In addition, it is assumed that the central axis of the laser scanning cross section has a distance of 3 meters (this parameter determines the angle between the laser scanner section and the ground) from the installation position of the laser scanner 111'. When a moving object comes to a distance of 25 meters from the laser scanner, the moving object is considered as just entering the monitoring region. In order to monitor more than one moving objects within the monitoring region at the same time, it can be deduced that the minimum distance between two adjacent moving objects within the monitoring region is 2.5 meters.

By utilizing a laser scanner as a device monitoring a state of a moving object (such as positioning, measuring speed, and so on), it is easy to install the device and has a low cost. In practical application, there is no need to strictly follow the inclined angle of the sensor required by the installation rules. The inclined installation angle will not affect the desired accuracy and algorithm. In addition, the laser scanner allows accurately measuring a low speed of a moving object, for example 5 kilometers per hour.

The processing unit 120 is configured to, for each moving object within the monitoring region, determine at least one fixed point on the moving object and receive a distance between the at least one fixed point of the moving object and an emitting position of the laser beams (i.e. the installation position of the laser scanner 110) and an emitting angle of a corresponding laser beam, all of which are detected by the laser scanner 110 at each time instance.

Firstly, the fixed point can be selected as a point for the laser scanner 110 to detect and return a variable data, for example, a point on the moving object with significant change (such as a point on the front edge or the tail portion of the object) or a point on a certain height of the object. However, the present disclosure is not limited thereto.

Figure 3:
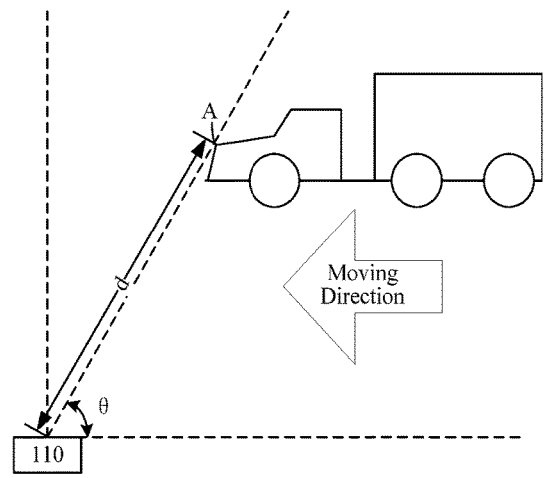
FIG. 3 is a schematic diagram illustrating a laser beam according to an example.

Generally, when scanning a moving object with the laser scanner 110, the laser scanner 110 emits laser beams of various angles at the same time instance. When a certain laser beam is reflected by the object, a distance between the reflecting point and the emitting position of the laser beam and the angle of the laser beam can be detected and returned. FIG. 3 is a schematic diagram illustrating a laser beam according to an example. As shown in FIG. 3, the laser scanner 110 can detect and return a distance d between the emitting position of each laser beam of an angle and a reflecting position of the laser beam (point A on the front edge of the head as shown in FIG. 3) and a corresponding emitting angle θ.

For the above moving object, the processing unit 120 is also configured to determine and output a relative position of the moving object with respect to the laser scanner at each time instance, according to the distance between the at least one fixed point of the moving object and the emitting position of each laser beam and an emitting angle of a corresponding laser beam, which are detected by the laser scanner 110 and received by the processing unit 120.

Figure 4:
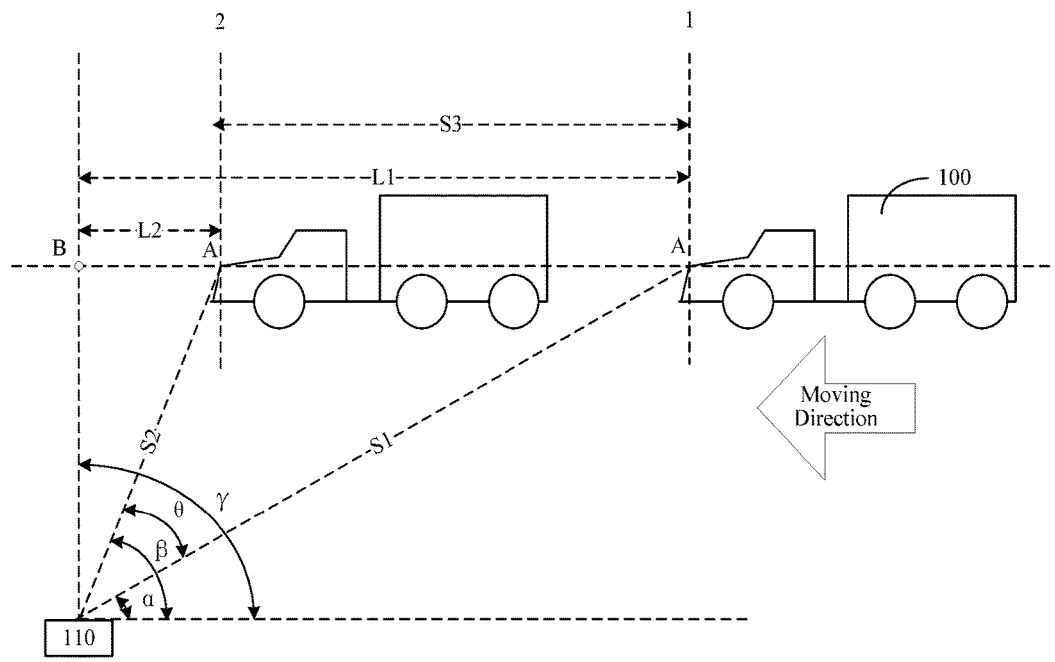
FIG. 4 is a schematic diagram illustrating a method for locating a moving object according to an example.

FIG. 4 is a schematic diagram illustrating a method for locating a moving object according to an example. As an example, as shown in FIG. 4, a certain fixed point A on the front edge of the moving object 100 is selected as the point for the laser scanner 110 to detect and return a variable data. As shown in FIG. 4, when the measuring range is empty, meaning that no object enters the monitoring region, a corresponding angle γ of a point nearest to the laser scanner 110 (such as Point B as shown in FIG. 4) is searched and stored. When the moving object 100 is located at Position 1, according to a distance S1 between the point on which the laser scanner 110 detects and returns a variable data (i.e. the fixed point A as shown in FIG. 4) and the current emitting position of the laser beam and the angle α of the laser beam, which are detected by the laser scanner 110, a relative distance L1 can be determined for the Position 1 with respect to the laser scanner 110, as follows:

$$L1=S1*\cos \alpha \quad (1)$$

$$\text{or, } L1=S1*\sin(\gamma-\alpha) \quad (2)$$

When the moving object 100 moves to Position 2 along the direction as shown by the arrow, according to a distance S2 between the point on which the laser scanner 110 detects and returns a variable data (i.e. the fixed point A as shown in FIG. 4) and the current emitting position of the laser beam and the angle β of the laser beam, which are detected by the laser scanner 110 for another time, a relative distance L2 can be determined for the Position 2 with respect to the laser scanner 110, as follows:

$$L2=S2*\cos \beta \quad (3)$$

Alternatively, the relative distance L2 between the Position 2 and the laser scanner 110 can be calculated from a moving distance S3 of the moving object between the Position 1 and the Position 2.

Firstly, an angle θ between S1 and S2 can be calculated from the angles α and β of the two laser beams. Then, S3 can be calculated based on the law of cosines.

$$S3=\sqrt{S1^2+S2^2-2*S1*S2*\cos\theta} \quad (4)$$

After that, L2 can be calculated from L1 which is derived from the formula (1): L2=L1−S3.

Further, in some embodiments, in order to reduce the data amount to be processed by the processing unit 120 and improve its processing efficiency, and at the same time, in order to focus on monitoring important monitoring range and improve the measuring accuracy, the monitoring range can be divided into sub-regions, and for different sub-regions, different moving distance intervals or time intervals can be used to measure and output the positions of the moving object. That is, the processing unit 120 can firstly determine in which sub-region the moving object is located with respect to the position of the laser scanner, to determine which moving distance interval or time interval to be used to measure and output the positions of the moving object. In an embodiment, when the moving object moves towards the laser scanner, the smaller the relative distance between the moving object and the laser scanner is, the smaller the time interval or moving distance interval can be. For example, as shown in FIG. 2, the monitoring region can be divided into four sub-regions. In this case, when the moving object moves into a Region 3 of the four sub-regions which is nearest to the laser scanner, the positions of the moving object can be measured and outputted most frequently, that is, the position of the moving object can be measured and outputted once every a minimum moving distance interval or a minimum time interval. Specific division of the region and selection of the outputting frequency can be determined depending on practical application, which is not limited by the present disclosure.

In addition, the processing unit 120 is also configured to, for the moving object, determine and output the moving speed of the moving object according to the distance between the at least one fixed point on the moving object and the emitting position of the laser beams and an emitting angle of a corresponding laser beam, which are detected by the laser scanner 110 and received by the processing unit 120.

For example, still referring to FIG. 4, as discussed above, after the relative distances L1 and L2 of the Position 1 and the Position 2 of the moving object 100 and the laser scanner are determined or the moving distance S3 between L1 and L2 is determined, the speed v of the moving object 100 can be calculated based on the following formula:

$$v = \frac{S3}{T} = \frac{L1 - L2}{|T1 - T2|} = \frac{\Delta L}{\Delta T} \quad (5)$$

Where T1 and T2 are respectively the time instances when the moving object 100 reaches the Position 1 and the Position 2. The time instances can be acquired for example from a formula for calculating time which is inherently provided in the processing unit 120. For example, the time instance when a first distance S1 is received is marked as T1, and the time instance when a second distance S2 is received is marked as T2. Alternatively, the times instances can also be acquired according to time instances which are carried in the data package returned by the laser scanner 110.

In some embodiments, more than one fixed points can be selected, for example, more than one point for returning variable data (such as points on different heights of the moving object or a plurality of distinct points on the moving object). Then, after the above moving distances are calculated based on the fixed points, the moving distances can be fitted, for example be averaged. The speed of the moving object can be calculated from the resulting average value of the moving distances. It can improve the accuracy of the speed by measuring more than one fixed points.

In addition, the speed of the moving object can be determined and outputted by means of dividing sub-regions. That is, the speed of the moving object can be determined and outputted with different moving distance intervals or time intervals depending on the relative position of the moving object with respect to the laser scanner 110.

The processing unit 120 can also be configured to detect a current moving direction of each moving object. For example, the processing unit 120 can determine a moving direction of the moving object at a current time instance according to the different relative positions of the moving object with respect to the laser scanner 110 at the current time instance and at the previous time instance. Firstly, for example, the processing unit 120 can learn whether the moving object is currently moving toward the laser scanner 110 or moving away from the laser scanner 110 according to the angles in the data returned by the laser scanner 110. When the moving object is moving toward the laser scanner 110, if the distance between the moving object and the laser scanner 110 at the current time instance is smaller than the distance between the moving object and the laser scanner 110 at the previous time instance, it can be considered that the moving object is moving forward; otherwise if the distance between the moving object and the laser scanner 110 at the current time instance is larger than the distance between the moving object and the laser scanner 110 at the previous time instance, it can be considered that the moving object is moving backward; or, if the distance between the moving object and the laser scanner 110 at the current time instance equals to the distance between the moving object and the laser scanner 110 at the previous time instance, it can be considered that the moving object stops moving. When the moving object is moving away from the laser scanner 110, if the distance between the moving object and the laser scanner 110 at the current time instance is larger than the distance between the moving object and the laser scanner 110 at the previous time instance, it can be considered that the moving object is moving forward; otherwise if the distance between the moving object and the laser scanner 110 at the current time instance is smaller than the distance between the moving object and the laser scanner 110 at the previous time instance, it can be considered that the moving object is moving backward.

In addition, the processing unit 120 can also be configured to directly determine the travelling direction according to the difference between two angles of laser beams returned at two time instances. For example, when the moving is toward the laser scanner 110, the angle of the laser beam will become smaller and smaller; and when the moving is away from the laser scanner 110, the angle of the laser beam will become larger and larger.

Based on determination of the moving speed of the moving object, it can be easily detected whether the moving object is in an abnormal state, such as travelling backward or stopping in the inspection channel, so the moving object can be fast handled.

By positioning or measuring a speed of a moving object using a laser scanner, the device for monitoring a state of a moving object provided by the present disclosure can significantly improve the accuracy of measuring a low speed of a moving object compared with a speed measuring sensor such as the radar. Moreover, the laser scanner is easy to install and has a low cost. In addition, the laser scanner can also easily detect an abnormal state (such as travelling backward or stopping in the inspection channel) of the moving object to allow fast handling of the moving object.

Figure 5:
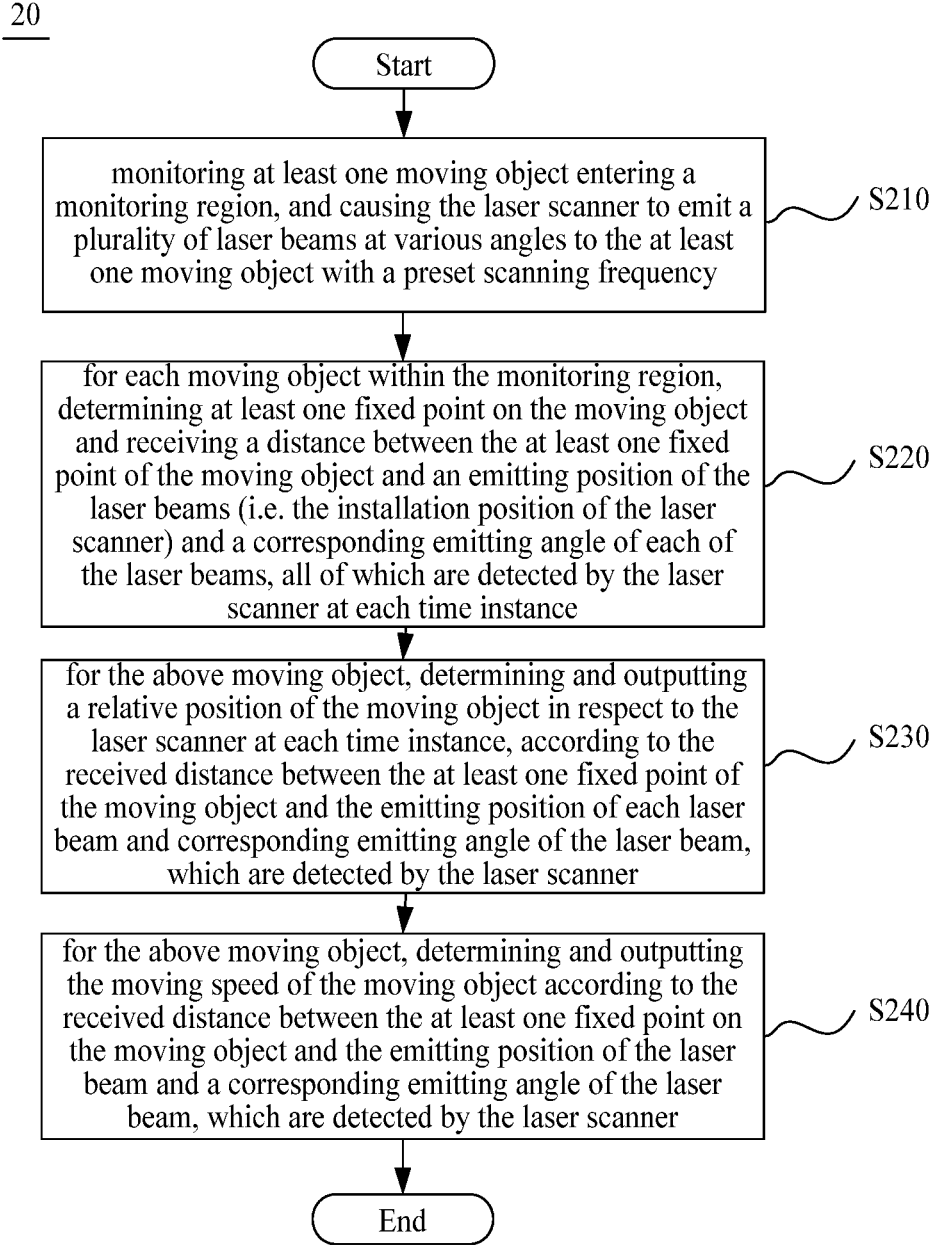
FIG. 5 is a flowchart illustrating a method for monitoring a state of a moving object based on a laser scanner according to an exemplary embodiment.

FIG. 5 is a flowchart illustrating a method for monitoring a state of a moving object based on a laser scanner according to an exemplary embodiment. As shown in FIG. 5, the method 20 includes the following steps.

At step S210, at least one moving object entering a monitoring region is monitored, the laser scanner is caused to emit a plurality of laser beams at various angles to the at least one moving object with a preset scanning frequency.

FIG. 2 is a schematic diagram illustrating a monitoring region of a laser scanner according to an example. As shown in FIG. 2, the laser scanner can be installed through two approaches. For a first approach, as shown by the laser scanner 111, for example, the laser scanner can be disposed on the top of the inspection channel, with the scanning cross section being perpendicular to the ground of the inspection channel. For a second approach, as shown by the laser scanner 111', for example, the laser scanner can be disposed over a side of the inspection channel, with the scanning cross section forming an acute angle or a blunt angle with the ground of the inspection channel. The laser scanner 111 or 111' can monitor the at least one moving object with a preset scanning frequency, for example 100 Hz (i.e. 100 times of scanning per second), and simultaneously emit a plurality of laser beams at various angles at a time. The plurality of laser beams constitute a scanning cross section covering a range (the monitoring region of the laser scanner 111 or 111') with a starting point A. The monitoring range of the laser scanner can be very broad, generally covering a continuous monitoring range of 80 meters or even longer in a front and back direction.

In some embodiments, since when monitoring a moving object using the laser scanner, the laser scanner can cover a very broad monitoring range, in order to avoid storage of a mass of unnecessary monitored data, generally, before the moving object passes beneath the laser scanner, the monitored data of the moving object will not be processed until the moving object reaches a preset position (corresponding to the position of the laser scanner). That is, the moving object will be considered as just entering the monitoring region from the preset position. In practice, for example, the preset position can be disposed at for example 25 meters ahead of the installation position of the laser scanner. However, the present disclosure is not limited thereto. Hereinafter a requirement on a minimum distance between two adjacent moving objects respectively for the above two installation approaches will be described.

For the first installation approach, firstly it is assumed that the laser scanner 111 is installed at a height of 5.2 meters for example, and all the moving objects have the same height, for example 4.8 meters. When a moving object comes to a distance of 25 meters from the laser scanner, the moving object is considered as just entering the monitoring region. In order to monitor more than one moving objects within the monitoring region at the same time, it can be deduced that the minimum distance between two adjacent moving objects within the monitoring region is 2 meters.

For the second installation approach, similarly, it is assumed that the laser scanner 111' is installed at a height of 5.2 meters for example, and all the moving objects have the same height, for example 4.8 meters. In addition, it is assumed that the central axis of the laser scanning cross section has a distance of 3 meters (this parameter determines the angle between the laser scanning cross section and the ground) from the installation position of the laser scanner 111'. When a moving object comes to a distance of 25 meters from the laser scanner, the moving object is considered as just entering the monitoring region. In order to monitor more than one moving objects within the monitoring region at the same time, it can be deduced that the minimum distance between two adjacent moving objects within the monitoring region is 2.5 meters.

By utilizing a laser scanner as a device for monitoring a state of a moving object (such as positioning, measuring speed, and so on), it is easy to install the device and has a low cost. In practical application, there is no need to strictly follow the inclined angle of the sensor required by the installation rules. The inclined installation angle will not affect the desired accuracy and algorithm. In addition, the laser scanner allows accurately measuring a low speed of a moving object, for example 5 kilometers per hour.

At step S220, for each moving object within the monitoring region, at least one fixed point on the moving object is determined and it is received a distance between the at least one fixed point of the moving object and an emitting position of the laser beams (i.e. the installation position of the laser scanner) and an emitting angle of a corresponding laser beam, all of which are detected by the laser scanner at each time instance.

Firstly, the fixed point can be selected as a point for the laser scanner to detect and return a variable data, for example, a point on the moving object with significant change (such as a point on the front edge or the tail portion of the object) or a point on a certain height of the object. However, the present disclosure is not limited thereto.

Generally, when scanning a moving object with the laser scanner, the laser scanner emits laser beams of various angles at the same time instance. When a certain laser beam is reflected by the object, a distance between the reflecting point and the emitting position of the laser beam and the angle of the laser beam can be detected and returned. FIG. 3 is a schematic diagram illustrating a laser beam according to an example. As shown in FIG. 3, the laser scanner can detect and return a distance d between the emitting position of each laser beam of an angle and a reflecting position of the laser beam (point A on the front edge of the head as shown in FIG. 3) and a corresponding emitting angle θ.

At step S230, for the above moving object, a relative position of the moving object with respect to the laser scanner at each time instance is determined and outputted, according to the received distance between the at least one fixed point of the moving object and the emitting position of each laser beam and an emitting angle of a corresponding laser beam, which are detected by the laser scanner.

FIG. 4 is a schematic diagram illustrating a method for locating a moving object according to an example. As an example, as shown in FIG. 4, a certain fixed point A on the front edge of the moving object 100 is selected as the point for the laser scanner 110 to detect and return a variable data. As shown in FIG. 4, when the measuring range is empty, meaning that no object enters the monitoring region, a corresponding angle γ of a point nearest to the laser scanner 110 (such as Point B as shown in FIG. 4) is searched and stored. When the moving object 100 is located at Position 1, according to a distance S1 between the point on which the laser sensor detects and returns a variable data (i.e. the fixed point A as shown in FIG. 4) and the current emitting position of the laser beam and the angle α of the laser beam, which are detected by the laser sensor, a relative distance L1 can be determined for the Position 1 with respect to the laser sensor, as follows:

$$L1 = S1 * \cos\alpha \qquad (1)$$

$$\text{or, } L1 = S1 * \sin(\gamma - \alpha) \qquad (2)$$

When the moving object 100 moves to Position 2 along the direction as shown by the arrow, according to a distance S2 between the point on which the laser scanner 110 detects and returns a variable data (i.e. the fixed point A as shown in FIG. 4) and the current emitting position of the laser beam and the angle β of the laser beam, which are detected by the laser scanner 110 for another time, a relative distance L2 can be determined for the Position 2 with respect to the laser sensor, as follows:

$$L2 = S2 * \cos\beta \qquad (3)$$

Alternatively, the Position 2 can be calculated from a moving distance S3 of the moving object between the Position 1 and the Position 2.

Firstly, an angle θ between S1 and S2 can be calculated from the angles α and β of the two laser beams. Then, S3 can be calculated based on the law of cosines.

$$S3=\sqrt{S1^2+S2^2-2*S1*S2*\cos\theta} \qquad (4)$$

After that, L2 can be calculated from L1 which is derived from the formula (1): L2=L1−S3.

In some embodiments, in order to reduce the data amount to be processed and improve the processing efficiency, and at the same time, in order to focus on monitoring important monitoring range and improve the measuring accuracy, the monitoring range can be divided into sub-regions, and for different sub-regions, different moving distance intervals or time intervals can be used to measure and output the positions of the moving object. That is, it can be firstly determined in which sub-region the moving object is located with respect to the position of the laser scanner, to determine which moving distance interval or time interval to be used to measure and output the positions of the moving object. In an embodiment, when the moving object moves towards the laser scanner, the smaller the relative distance between the moving object and the laser scanner is, the smaller the time interval or moving distance interval can be. For example, as shown in FIG. 2, the monitoring region can be divided into four sub-regions. In this case, when the moving object moves into a Region 3 of the four sub-regions which is closest to the laser scanner, the positions of the moving object can be measured and outputted most frequently, that is, the position of the moving object can be measured and outputted once every a minimum moving distance interval or a minimum time interval. Specific division of the region and selection of the outputting frequency can be determined depending on practical application, which is not limited by the present disclosure.

In addition to positioning the moving object, a current moving direction of each moving object can also be detected at any time instance. For example, a moving direction of the moving object at a current time instance can be determined according to the different relative positions of the moving object with respect to the laser scanner at the current time instance and at the previous time instance. Firstly, for example, it can be learned whether the moving object is currently moving toward the laser scanner or moving away from the laser scanner according to the angles in the data returned by the laser scanner. When the moving object is moving toward the laser scanner, if the distance between the moving object and the laser scanner 110 at the current time instance is smaller than the distance between the moving object and the laser scanner at the previous time instance, it can be considered that the moving object is moving forward; otherwise if the distance between the moving object and the laser scanner at the current time instance is larger than the distance between the moving object and the laser scanner at the previous time instance, it can be considered that the moving object is moving backward; or, if the distance between the moving object and the laser scanner at the current time instance equals to the distance between the moving object and the laser scanner at the previous time instance, it can be considered that the moving object stops moving. When the moving object is moving away from the laser scanner, if the distance between the moving object and the laser scanner at the current time instance is larger than the distance between the moving object and the laser scanner at the previous time instance, it can be considered that the moving object is moving forward; otherwise if the distance between the moving object and the laser scanner at the current time instance is smaller than the distance between the moving object and the laser scanner at the previous time instance, it can be considered that the moving object is moving backward.

In addition, the travelling direction can also be directly determined according to the difference between two angles of laser beams returned at two time instances. For example, when the moving is toward the laser scanner, the angle of the returned laser beam will become smaller and smaller; and when the moving is away from the laser scanner, the angle of the returned laser beam will become larger and larger.

Based on determination of the moving speed of the moving object, it can be easily detected whether the moving object is in an abnormal state, such as travelling backward or stopping in the inspection channel, so the moving object can be fast handled.

At step S240, for the moving object, the moving speed of the moving object is determined and outputted according to the received distance between the at least one fixed point on the moving object and the emitting position of the laser beams and an emitting angle of a corresponding laser beam, which are detected by the laser scanner.

For example, still referring to FIG. 4, as discussed above, after the relative distances L1 and L2 of the Position 1 and the Position 2 of the moving object 100 and the laser scanner are determined or the moving distance S3 between L1 and L2 is determined, the speed v of the moving object 100 can be calculated based on the following formula:

$$v = \frac{S3}{T} = \frac{L1-L2}{|T1-T2|} = \frac{\Delta L}{\Delta T} \qquad (5)$$

Where T1 and T2 are respectively the time instances when the moving object 100 reaches the Position 1 and the Position 2. The time instances can be acquired by the laser scanner.

In some embodiments, more than one fixed points can be selected, for example, more than one points for returning variable data (such as points on different heights of the moving object or a plurality of distinct points with significant change on the moving object). Then, after the above moving distances are calculated based on the fixed points, the moving distances can be fitted, for example be averaged. The speed of the moving object can be calculated from the resulting average value of the moving distances. It can improve the accuracy of the speed by measuring more than one fixed points.

Figure 6:
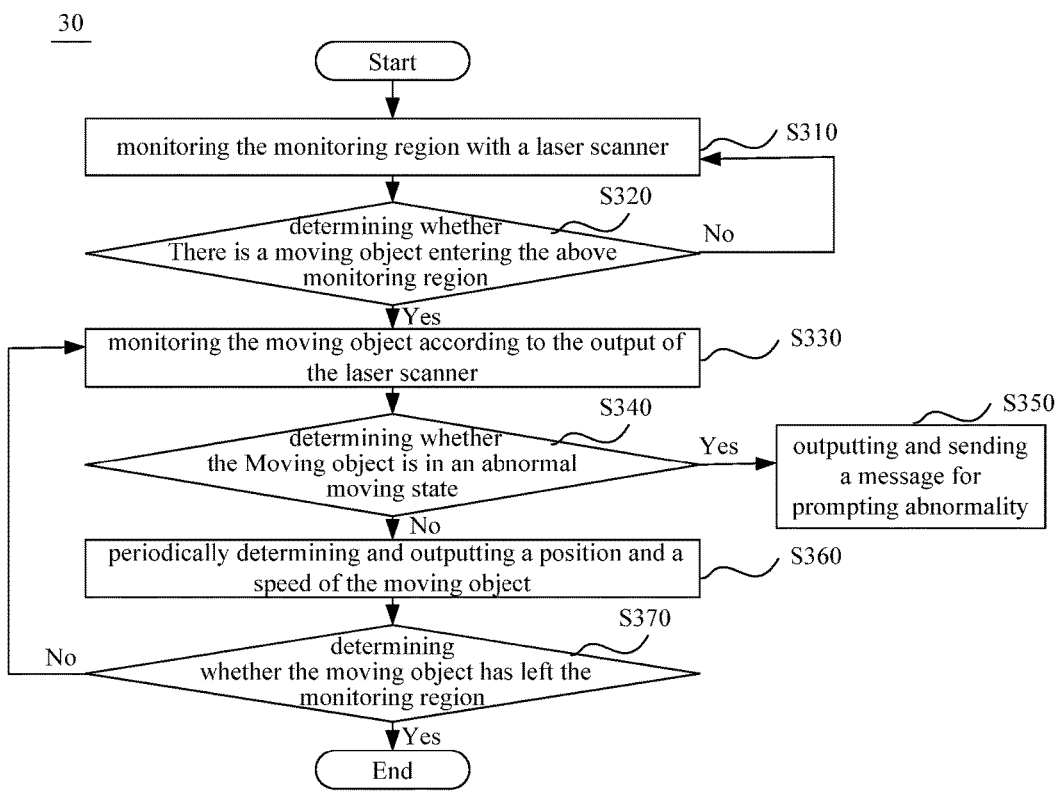
FIG. 6 is a flowchart illustrating a method for monitoring a state of a moving object based on a laser scanner according to another exemplary embodiment.

FIG. 6 is a flowchart illustrating a method for monitoring a state of a moving object based on a laser scanner according to another exemplary embodiment. As shown in FIG. 6, the method 30 includes the following steps.

At step S310, the monitoring region is monitored with a laser scanner.

The monitoring region can be, for example, a maximum range covered by the scanning cross section of the above laser scanner. Alternatively, the monitoring region can be a previously optimized to avoid storage of unnecessary monitored data.

In addition, the monitoring can be conducted by the laser scanner or by ground sensor coils, light curtains, and the like.

At step S320, it is determined whether there is a moving object entering the above monitoring region. If there is a moving object entering the above monitoring region, the step S330 is performed; otherwise the process is returned to the step S310.

At step S330, the moving object is monitored according to the output of the laser scanner.

At step S340, it is determined whether the moving object is in an abnormal moving state. If the moving object is in a normal moving state, step S360 is performed; otherwise step S350 is performed.

The abnormal moving state of the moving object can include, for example, the moving object travelling backward or stopping in the inspection channel. The specific method for detecting the abnormal moving state has been discussed above, which will not be repeated herein.

At step S350, a message for prompting abnormality is outputted and sent out.

At step S360, a position and a speed of the moving object can be periodically determined and outputted.

The method for determining the position and the speed of the moving object has been discussed above, which will not be repeated herein. The period can be a fixed period. Alternatively, different moving distance intervals or time intervals can be set for different sub-regions accordingly, as discussed above.

At step S370, it is determined whether the moving object has left the monitoring region. If the moving object has left the monitoring region, the monitoring of the moving object is ended; otherwise the process is returned to step S330.

For example, it can be determined whether the moving object has left the monitoring region through data of the tail portion of the moving object, which is returned by the laser scanner. Alternatively, the detection can be made by means of the ground senser coils and light curtains, which will not be limited in the present disclosure.

By positioning or measuring a speed of a moving object using a laser scanner, the method for monitoring a state of a moving object provided by the present disclosure can significantly improve the accuracy of measuring a low speed of a moving object compared with a speed measuring sensor such as the radar. Moreover, the laser scanner is easy to install and has a low cost. In addition, the laser scanner can also easily detect an abnormal state (such as travelling backward or stopping in the inspection channel) of the moving object to allow fast handling of the moving object.

Figure 7:
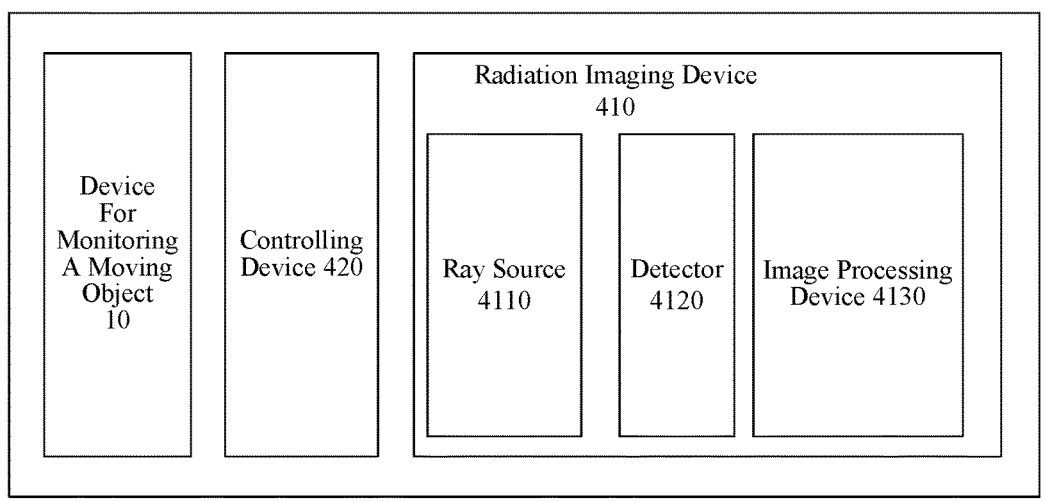
FIG. 7 is a block diagram illustrating a system for fast inspecting a vehicle according to an exemplary embodiment.

FIG. 7 is a block diagram illustrating a system for fast inspecting a vehicle according to an exemplary embodiment. As shown in FIG. 7, the system 40 for fast inspecting a vehicle includes a radiation imaging device 410, a device 10 for monitoring a moving object and a controlling device 420.

In an embodiment, the radiation imaging device 410 includes a ray source 4110 configured to emit radiation beams for detecting a subject vehicle; a detector 4120 configured to detect radiation rays transmitted through the subject vehicle and/or scattered radiation rays; and an image processing device 4130 configured to present images according to signals of the radiation rays detected by the detector 4120.

The device 10 for monitoring a moving object, as discussed above, is configured to monitor a moving state of the subject vehicle in the system 40 for fast inspecting a vehicle, for example, to detect whether the subject vehicle is abnormal (such as travelling backward or stopping in the inspection channel), to detect a position of the subject vehicle, to determine a travelling speed of the subject vehicle, and so forth. Detailed description of the device 10 for monitoring a moving object can refer to the above, which will not be repeated herein.

The controlling device 420 is configured to control the radiation imaging device 410 to emit radiation rays to the subject vehicle according to the output of the device 10 for monitoring a moving object. For example, the controlling device 420 can position the cab of the subject vehicle through the device 10 for monitoring a moving object, determine whether the cab has left the beam emitting position of the radiation rays, and begin to emit radiation rays to the subject vehicle after it determines that the cab has left the beam emitting position. Alternatively, the controlling device 420 can also determine the beam emitting timing according to the position information, speed information outputted by the device 10 for monitoring a moving object in combination with the length information and model information of the subject vehicle.

By utilizing the device for monitoring a moving object, the system for fast inspecting a vehicle of the present disclosure can improve the accuracy in determining the timing for emitting radiation rays, so as to effectively avoid security risk to the driver caused by mistaken determination of the head of the subject vehicle.

The exemplary embodiments of the present disclosure have been illustrated and described above. It should be understood that, the present disclosure is not limited to the embodiments disclosed. Instead, the present disclosure intends to cover all the alterations and equivalent replacements within the scope of the appending claims.

What is claimed is:

1. A device for monitoring a state of a moving object, comprising:
   a laser scanner configured to monitor at least one moving object entering a monitoring region, by emitting a plurality of laser beams of different angles to the at least one moving object with a preset scanning frequency; and
   a processing unit configured to, for each moving object, determine at least one fixed point on the moving object, receive a first distance between the at least one fixed point of the moving object and an emitting position of the laser beams and an emitting angle of a corresponding laser beam, all of which are detected by the laser scanner at each time instance, and determine and output a relative position of the moving object with respect to the laser scanner at each time instance according to the first distance and the emitting angle of the corresponding laser beam, wherein the fixed point is a same point relative to the moving object,
   wherein the processing unit is further configured to, for each moving object, according to the determined relative position of the moving object with respect to the laser scanner, output a current relative position of the moving object with respect to the laser scanner with different time intervals or with different moving distance intervals of the moving object, and
   wherein when the moving object moves towards the laser scanner, the smaller the relative distance between the moving object and the laser scanner is, the smaller the time interval or the moving distance interval is.

2. The device for monitoring a state of a moving object of claim 1, wherein the processing unit is further configured to, for each moving object, determine and output a moving speed of the moving object according to the first distance and the emitting angle of the corresponding laser beam.

3. The device for monitoring a state of a moving object of claim 1, wherein the processing unit is further configured to, for each moving object, determine and output a moving speed of the moving object according to the first distance and the emitting angle of the corresponding laser beam.

4. The device for monitoring a state of a moving object of claim 2, wherein the at least one fixed point includes a plurality of fixed points, and determining a moving speed of the moving object according to the first distance and the emitting angle of the corresponding laser beam comprises: acquiring a second distance of the moving object at a time instance according to first distances between the fixed points of the moving object and the emitting position of the laser beams at the same time instance; and determining the moving speed of the moving object according to second distances of the moving object at time instances.

5. The device for monitoring a state of a moving object of claim 4, wherein the processing unit is configured to average the first distances to acquire the second distance.

6. The device for monitoring a state of a moving object of claim 1, wherein the processing unit is further configured to, for each moving object, determine a moving direction of the moving object at a current time instance.

7. The device for monitoring a state of a moving object of claim 1, wherein the processing unit is further configured to, for each moving object, determine a moving direction of the moving object at a current time instance.

8. The device for monitoring a state of a moving object of claim 6, wherein the processing unit is configured to determine the moving direction of the moving object at the current time instance according to the different relative positions of the moving object with respect to the laser scanner at the current time instance and at the previous time instance.

9. A method for monitoring a state of a moving object based on a laser scanner, comprising:
monitoring at least one moving object entering a monitoring region, by causing the laser scanner to emit a plurality of laser beams of different angles to the at least one moving object with a preset scanning frequency; and
for each moving object,
determining at least one fixed point on the moving object, the fixed point being a same point relative to the moving object;
receiving a first distance between the at least one fixed point of the moving object and an emitting position of the laser beams and an emitting angle of a corresponding laser beam, all of which are detected by the laser scanner at each time instance; and
determining and outputting a relative position of the moving object with respect to the laser scanner at each time instance according to the first distance and the emitting angle of the corresponding laser beam
wherein the method further comprises:
for each moving object, according to the determined relative position of the moving object with respect to the laser scanner, determining and outputting a current relative position of the moving object with respect to the laser scanner with different time intervals or with different moving distance intervals of the moving object.

10. The method for monitoring a state of a moving object based on a laser scanner of claim 9, further comprising: for each moving object, determining and outputting a moving speed of the moving object according to the first distance and the emitting angle of the corresponding laser beam.

11. The method for monitoring a state of a moving object based on a laser scanner of claim 9, further comprising: for each moving object, determining and outputting a moving speed of the moving object according to the first distance and the emitting angle of the corresponding laser beam.

12. The method for monitoring a state of a moving object based on a laser scanner of claim 10, wherein the at least one fixed point includes a plurality of fixed points, and determining a moving speed of the moving object according to the first distance and the emitting angle of the corresponding laser beam comprises: acquiring a second distance of the moving object at a time instance according to first distances between the fixed points of the moving object and the emitting position of the laser beams at the same time instance; and determining the moving speed of the moving object according to second distances of the moving object at time instances.

13. The method for monitoring a state of a moving object based on a laser scanner of claim 9, further comprising: for each moving object, determining a moving direction of the moving object at a current time instance.

14. The method for monitoring a state of a moving object based on a laser scanner of claim 9, further comprising: for each moving object, determining a moving direction of the moving object at a current time instance.

15. A system for fast inspecting a vehicle, comprising:
a radiation imaging device comprising: a ray source configured to emit radiation rays for detecting a subject vehicle; a detector configured to detect radiation rays transmitted through the subject vehicle and/or scattered radiation rays; and an image processing device configured to present images according to signals of the radiation rays detected by the detector;
a controlling device configured to control the radiation imaging device to emit radiation rays to the subject vehicle according to an output of a monitoring device for monitoring a state of a moving object; and
the monitoring device, the monitoring device comprising:
a laser scanner configured to monitor at least one moving object entering a monitoring region, by emitting a plurality of laser beams of different angles to the at least one moving object with a preset scanning frequency; and
a processing unit configured to, for each moving object, determine at least one fixed point on the moving object, receive a first distance between the at least one fixed point of the moving object and an emitting position of the laser beams and an emitting angle of a corresponding laser beam, all of which are detected by the laser scanner at each time instance, and determine and output a relative position of the moving object with respect to the laser scanner at each time instance according to the first distance and the emitting angle of the corresponding laser beam, wherein the fixed point is a same point relative to the moving object,
wherein the processing unit is further configured to, for each moving object, according to the determined relative position of the moving object with respect to the laser scanner, output a current relative position of the moving object with respect to the laser scanner with different time intervals or with different moving distance intervals of the moving object, and
wherein when the moving object moves towards the laser scanner, the smaller the relative distance between the moving object and the laser scanner is, the smaller the time interval or the moving distance interval is.

16. The system of claim 15, wherein the processing unit of the monitoring device is further configured to, for each moving object, determine and output a moving speed of the moving object according to the first distance and the emitting angle of the corresponding laser beam.

17. The system of claim 15, wherein the processing unit of the monitoring device is further configured to, for each moving object, determine and output a moving speed of the moving object according to the first distance and the emitting angle of the corresponding laser beam.

18. The system of claim 16, wherein the at least one fixed point includes a plurality of fixed points, and determining a moving speed of the moving object according to the first distance and the emitting angle of the corresponding laser beam comprises: acquiring a second distance of the moving object at a time instance according to first distances between the fixed points of the moving object and the emitting position of the laser beams at the same time instance; and determining the moving speed of the moving object according to second distances of the moving object at time instances.

19. The system of claim 18, wherein the processing unit of the monitoring device is configured to average the first distances to acquire the second distance.

20. The system of claim 15, wherein the processing unit of the monitoring device is further configured to, for each moving object, determine a moving direction of the moving object at a current time instance.

\* \* \* \* \*